(12) United States Patent
O'Neill et al.

(10) Patent No.: US 7,326,031 B2
(45) Date of Patent: Feb. 5, 2008

(54) ACCESS PORT FOR DIRT REMOVAL FOR GAS TURBINE ENGINE

(75) Inventors: Lisa O'Neill, Manchester, CT (US); Richard Silverman, Tolland, CT (US); Barry Beckwith, Coventry, CT (US); Edward F. Pietraszkiewicz, Southington, CT (US)

(73) Assignee: United Technologies Corporation, Hartford, CT (US)

( * ) Notice: Subject to any disclaimer, the term of this patent is extended or adjusted under 35 U.S.C. 154(b) by 148 days.

(21) Appl. No.: 11/369,774

(22) Filed: Mar. 7, 2006

(65) Prior Publication Data

US 2007/0048127 A1    Mar. 1, 2007

Related U.S. Application Data

(63) Continuation-in-part of application No. 11/214,238, filed on Aug. 29, 2005, now Pat. No. 7,284,953.

(51) Int. Cl.
*F03B 11/00*    (2006.01)

(52) U.S. Cl. .................. 415/121.2; 415/115; 415/201; 416/97 R

(58) Field of Classification Search ................ 415/115, 415/121.2, 201, 169.1; 416/97 R, 97 A; 60/39.092
See application file for complete search history.

(56) References Cited

U.S. PATENT DOCUMENTS

| | | | |
|---|---|---|---|
| 3,142,155 A * | 7/1964 | Levesque et al. ........... 415/176 |
| 3,380,711 A * | 4/1968 | Blattner et al. .......... 415/121.2 |
| 4,685,942 A | 8/1987 | Klassen et al. |
| 4,798,047 A * | 1/1989 | Geary ...................... 415/121.2 |
| 4,928,480 A * | 5/1990 | Oliver et al. ............ 60/39.092 |
| 6,698,180 B2 | 3/2004 | Snyder |
| 6,814,539 B2 * | 11/2004 | Farnsworth et al. ..... 415/121.2 |

* cited by examiner

*Primary Examiner*—Igor Kershteyn
(74) *Attorney, Agent, or Firm*—Carlson, Gaskey & Olds

(57) ABSTRACT

A gas turbine engine is provided with a dirt separator placed in a path of the radially outer cooling air flow, and includes a radially outer leg that defines a space to capture dirt or other impurities. An access port is provided in a turbine engine case in an area adjacent to the dirt separator. The access port has two openings at a tangent to the centerline of the gas turbine engine covered by access port covers which can be removed to allow a cleaning tool to have access through the access port.

16 Claims, 3 Drawing Sheets

ACCESS PORT FOR DIRT REMOVAL FOR GAS TURBINE ENGINE

This application is a continuation-in-part and claims priority to U.S. patent application Ser. No. 11/214,238, filed Aug. 29, 2005, now U.S Pat. No. 7,284,953.

BACKGROUND OF THE INVENTION

This application relates to a dirt separator positioned in the path of a radially outer cooling air supply for gas turbine engine components, and wherein the dirt separator ensures that heavier dirt-laden air is not passed downstream to gas turbine components.

Gas turbine engines incorporate a number of components, which operate in a very challenging environment. As an example, a turbine section includes stationary vanes, rotating blades and seals. These components are subject to high temperatures, thermal stresses, etc.

Cooling air passes through cooling channels in the vanes, the blades, and in various seals. The cooling air is supplied from a radially inner location within the engine, and from radially outward locations. For several reasons, the air from the radially outer locations tends to carry more dirt and impurities. In the past, this dirt could clog small cooling channels in the components.

The present invention is directed to separating this dirt from the radially outer air, such that the air delivered to the various components of a gas turbine engine is cleaner.

SUMMARY OF THE INVENTION

In a disclosed embodiment, a dirt separator is secured within a housing for a gas turbine engine, and in the flow path of a radially outer cooling air supply. The disclosed dirt separator is generally vertex shaped, with an outer leg that is generally solid, and an inner leg that is, for the most part, open. The dirt, which is heavier, will tend to be at a radially outermost location in the air flow, and thus will move against the solid outer leg. The cleaner air will move through the perforations in the inner leg, and downstream to cool components such as vanes, rotor blades, blade outer air seals, etc.

An access port may be provided in a housing in an area adjacent to the outer leg of the dirt separator. This access port provides access for a cleaning tool to periodically remove separated dirt. A disclosed access port has two openings at angles into the turbine case of the gas turbine engine and is located at the bottom dead center of the gas turbine engine for convenient access to remove the impurities. The openings are covered by access port covers which can be removed to allow a cleaning tool to have access through the access port.

For turbine engines already having a dirt separator but no area designed to capture the dirt, a portion of material from the turbine case can be removed to form an opening. A preformed access port or a dirt trap can be added. The preformed dirt trap can be retained by inserting the dirt trap from the inside of the turbine case and welding the dirt trap in place.

These and other features of the present invention can be best understood from the following specification and drawings, the following of which is a brief description.

DETAILED DESCRIPTION OF THE PREFERRED EMBODIMENT

Figure 1:
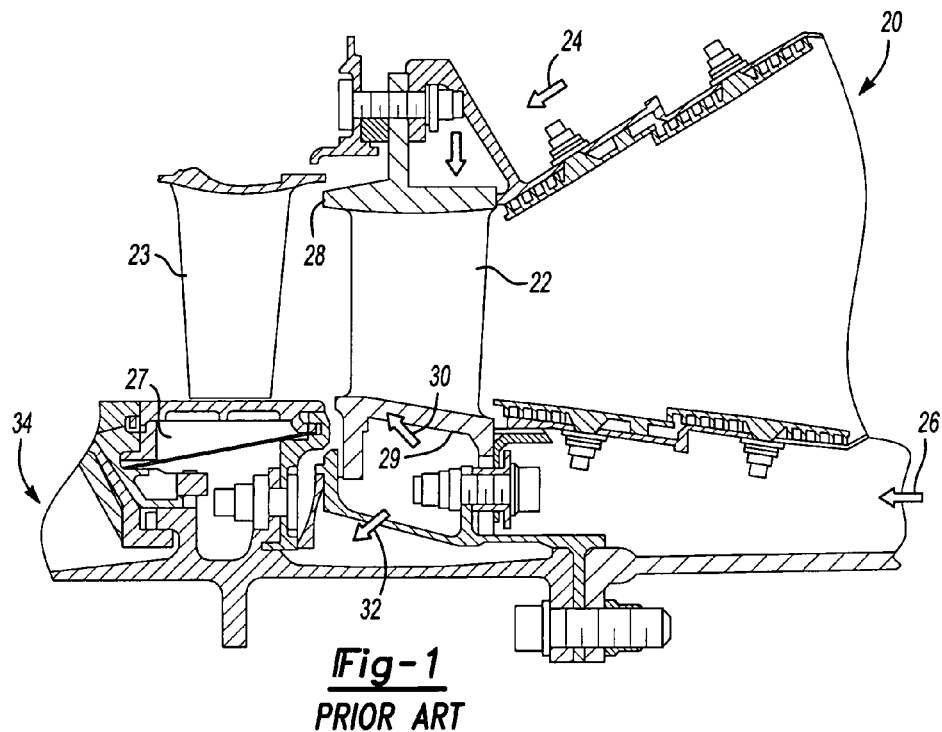
FIG. 1 shows a portion of a prior art gas turbine engine.
Figure 2:
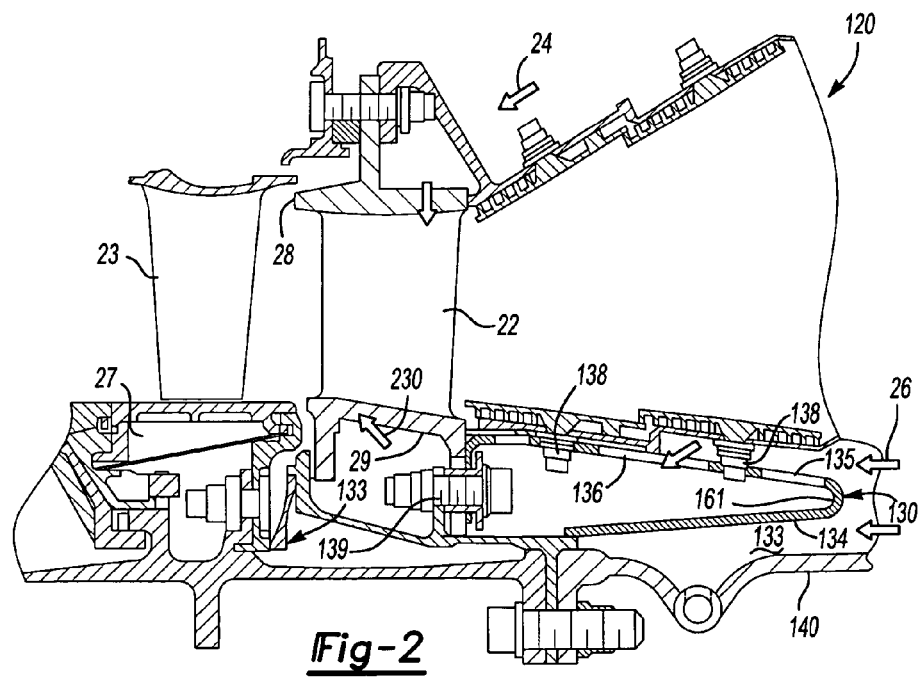
FIG. 2 shows a gas turbine engine incorporating the inventive dirt separator.

A portion of a gas turbine engine 20 is illustrated in FIG. 1. As shown, a vane 22, rotor blades 23, and blade outer air seals 27, are positioned within the gas turbine engine. Cooling air flow for the vanes 22, blades 23 and seals 27 includes both a radially inner source 24 and a radially outer source 26. As known, a portion of the radially outer air flow source 26 may be directed radially inwardly such as at 30 to the vane 22, and radially outwardly at 32, downstream toward the seal 27. The inner supply 24 moves through openings (not shown) in a radially inner surface 28 of the vane 22, and from flow path 30 through openings (not shown) in a radially outer surface 29 of the vane 22.

As is known, the air in outer path 26 tends to carry more dirt than the air in path 24. The air in outer path 26 has been directed from an upstream diffuser. By this point, centrifugal forces have forced heavier, dirty air radially outwardly. The dirt in this cooling air can clog cooling channels in the components.

The present invention is directed in large part to removing this dirt from the air in outer path 26.

To this end, an inventive gas turbine engine 120 has the same basic structure as the gas turbine structure in FIG. 1. However, a dirt separator 130 is inserted into the flow path 26. An outer leg 134 is generally solid, and defines a space 133 to capture dirt. An inner leg 135 has a number of perforations 136 to allow the air flow 26 to move through the radially inner leg 135. An apex 161 of the dirt separator tends to direct dirt towards outer leg 134 and air towards inner leg 135. A plurality of bolts 138 and 139 secure the dirt separator 130 to housing structure 140.

Air flow 24 continues to flow to the radially inner surface 28 of the vane, and downstream to the rotor blade 23 and seal 27. The flow path 26 has now been cleaned of much of the impurities. Thus, the air moving to the outer periphery 29 of the vane 22 at 230 tends to be cleaner, and the air 132 moving further downstream also tends to be cleaner.

An access port 142 in the housing 140 provides an access opening for a cleaning tool, such as a vacuum, to remove dirt or other impurities 152 from space 133. The access port 142 is closed with access port covers 156 (shown in FIG. 3B) when cleaning is not occurring.

Figure 3A:
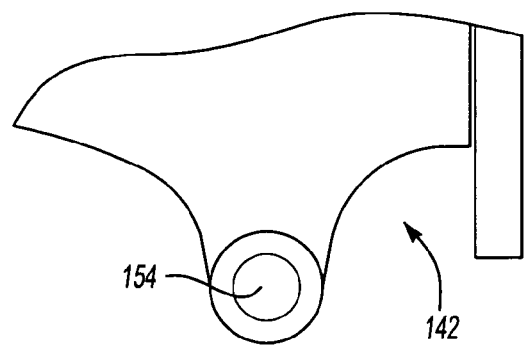
FIG. 3a is a side view of one embodiment of an access port of the present invention.
Figure 3B:
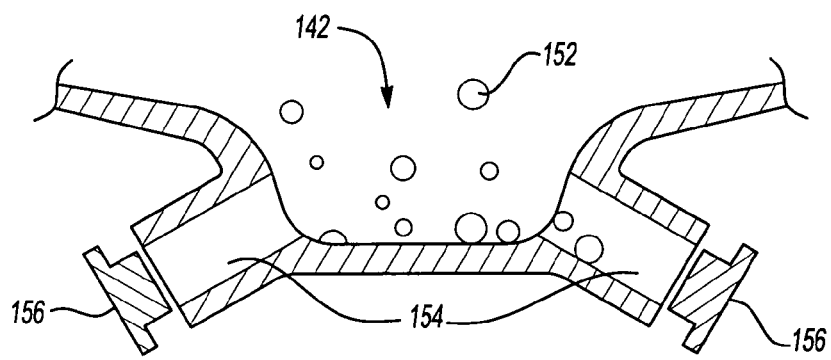
FIG. 3b is a sectional view of one embodiment of an access port of the present invention.
Figure 4:
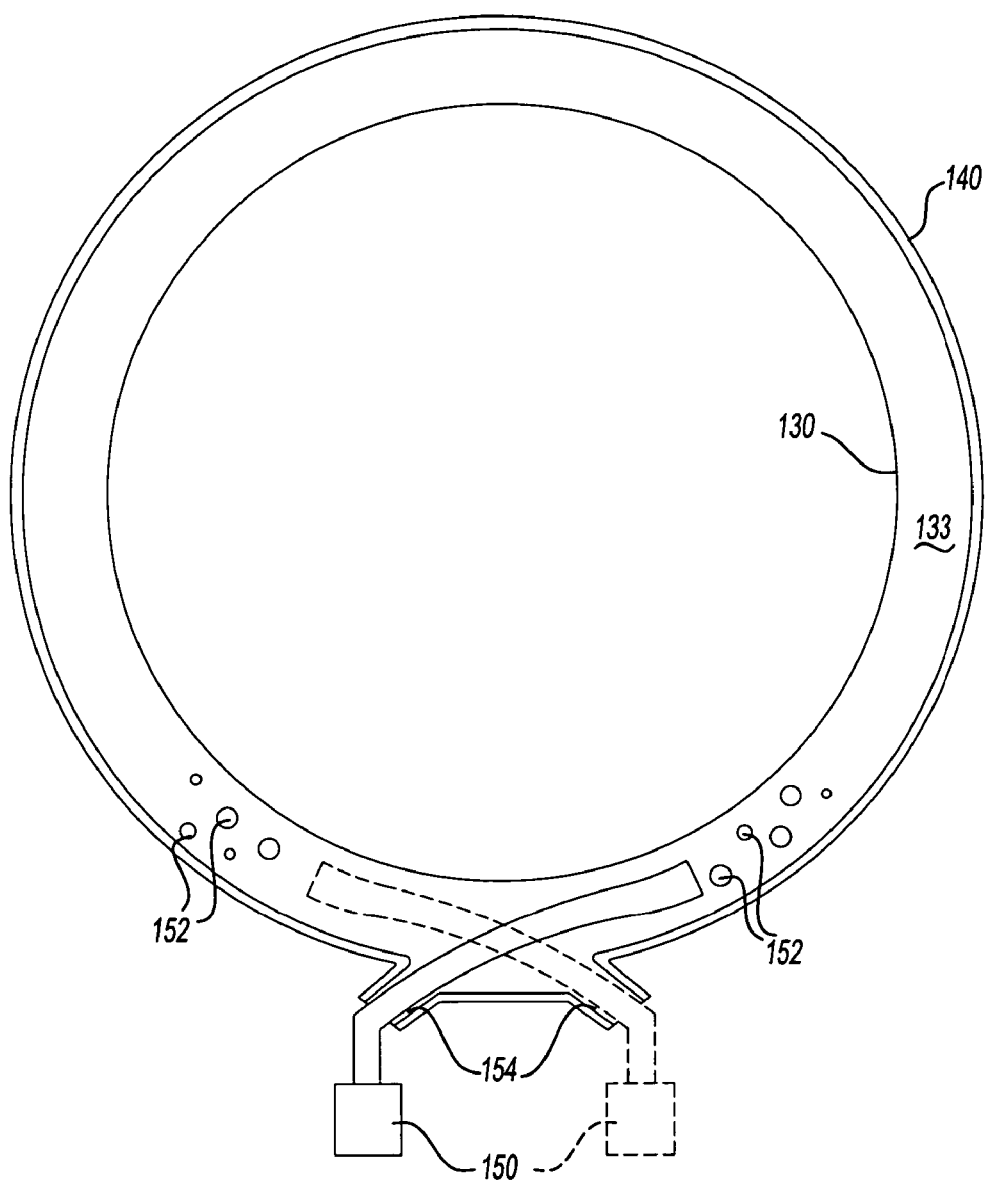
FIG. 4 shows a cross-section of the turbine engine illustrating a cleaning method.

FIGS. 3a and 3b show a cross section of an end view and side view of the access port 142. The access port 142 has at least one opening 154. In the embodiment shown there are two openings 154. The openings 154 in the access port 142 are at a tangent to the centerline of the gas turbine engine 120. That is, the openings 154 are at an angle other than perpendicular to the centerline of the gas turbine engine 120. The access port 142 is preferably located at the bottom dead center of the gas turbine engine 120 for convenient access to remove the impurities. The openings 154 are covered by access port covers 156. The access port covers 156 can be removed, as shown, to allow a cleaning tool to have access through the access port 142. As shown in FIG. 4, cleaning tool 150 removes the collected impurities 152 through the access port 142.

FIG. 4 illustrates a cross-section of the turbine engine 10. Impurities 152 collect within the space 133 formed by the outer case housing 140 of the turbine engine 10 when separated by the dirt separator 130 as described above. Due to the angle of the openings 154 the cleaning tool 150 can be moved around the gas turbine engine 120 in the clockwise direction, as shown, or the counter clockwise direction, shown in phantom, to further aid in removing the impurities 152.

Figure 5:
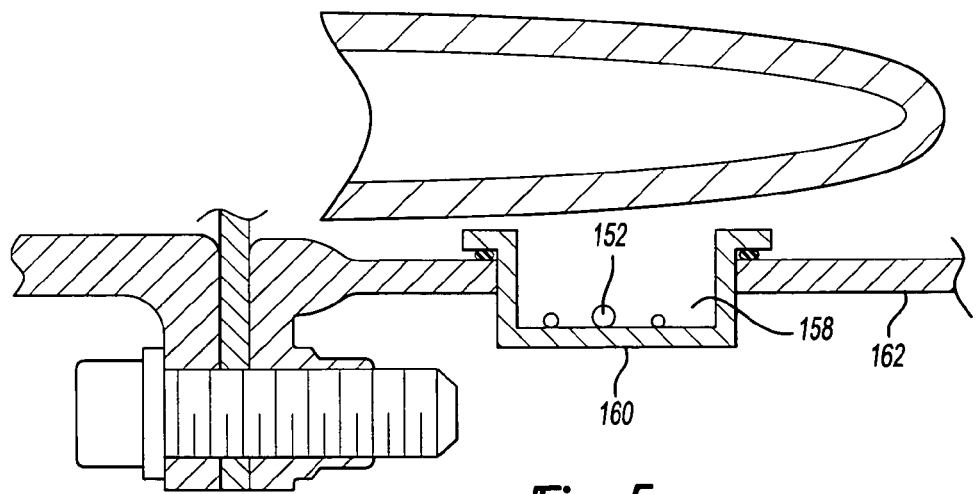
FIG. 5 is an embodiment showing an embodiment of a dirt collector of the present invention.

FIG. 5 shows an embodiment of an access port 142 which can be added to a gas turbine engine 120 already having a dirt separator but no area designed to capture the dirt or access for removing the collected impurities. A portion of material from the turbine case 162 can be removed to form an opening 158. A preformed access port 142, as described above, or a dirt trap 160 can be added depending on the application and the requirement for dirt collection or dirt removal. The preformed dirt trap 160 can be retained by inserting the dirt trap 160 from the inside of the turbine case 162 and welding the dirt trap 160 in place. Due to the high pressure within the gas turbine engine 120 an overlapping weld joint, as shown, would be preferred.

The present invention thus provides a simple way of removing a good deal of the dirt that is found in the radially outer air flow, prior to that air flow reaching the cooling chambers. In the past, this dirt may have clogged some of the smaller cooling channels. The present invention thus provides the benefit of reducing or eliminating such clogging.

Although a preferred embodiment of this invention has been disclosed, a worker of ordinary skill in this art would recognize that certain modifications would come within the scope of this invention. For that reason, the following claims should be studied to determine the true scope and content of this invention.

What is claimed is:

1. A gas turbine engine comprising:
   a turbine section including a housing surrounding a stationary vane and a rotating rotor,
   a dirt separator positioned in a flow path of a radially outer cooling air flow to at least one of said stationary vane and said rotating rotor, said dirt separator being operable to remove impurities from said radially outer cooling air flow; and
   an access port formed in said housing to remove captured impurities.

2. The gas turbine engine as set forth in claim 1, wherein said access port is located on a tangent to a centerline of the turbine.

3. The gas turbine engine as set forth in claim 2, wherein said access port is located at a bottom dead center location in the turbine section.

4. The gas turbine engine as set forth in claim 2, wherein a cleaning tool may communicate with said access port to remove captured impurities.

5. The gas turbine engine as set forth in claim 3, wherein the cleaning tool is movable circumferentially about the turbine engine due to the angle of the access port.

6. The gas turbine engine as set forth in claim 4, wherein the cleaning tool is movable in a clockwise direction relative to the centerline of the turbine engine due to the angle of the access port.

7. The gas turbine engine as set forth in claim 4, wherein the cleaning tool is movable in a counterclockwise direction relative to the centerline of the turbine engine due to the angle of the access port.

8. The gas turbine engine as set forth in claim 1, wherein said access port is selectively shielded by an access port cover.

9. A method of removing impurities from gas turbine engine comprising:
   a) separating impurities from a radially outer cooling air flow to at least one of a stationary vane and a rotating rotor in a turbine section of the engine;
   b) accumulating the impurities proximate an access port located on a tangent to a centerline of the turbine; and
   c) removing the impurities through the access port.

10. The method as set forth in claim 8, wherein said step c) includes inserting a cleaning tool through the access port to remove the impurities.

11. The method as set forth in claim 8, wherein said step c) includes moving the cleaning tool circumferentially about the turbine engine.

12. The method as set forth in claim 10, wherein said step c) includes moving the cleaning tool in a clockwise direction relative to the centerline of the turbine engine.

13. The method as set forth in claim 10, wherein said step c) includes moving the cleaning tool in a counter-clockwise direction relative to the centerline of the turbine engine.

14. The method as set forth in claim 8, wherein further including d) shielding the access port with an access port cover.

15. The method as set forth in claim 8 further including e) cutting the access port in an outer case of the turbine engine and inserting a dirt trap within the access port.

16. The method as set forth in claim 15 said step b) includes accumulating the impurities within the dirt trap.

* * * * *